Nov. 7, 1950 W. V. HELMS 2,529,023
POTATO DIGGING AND SEPARATING MACHINE
Filed Oct. 29, 1948 4 Sheets-Sheet 1

Warren V. Helms
INVENTOR.

BY Clarence A. O'Brien
and Harvey B. Jackson
Attorneys

Nov. 7, 1950 W. V. HELMS 2,529,023
POTATO DIGGING AND SEPARATING MACHINE
Filed Oct. 29, 1948 4 Sheets-Sheet 2
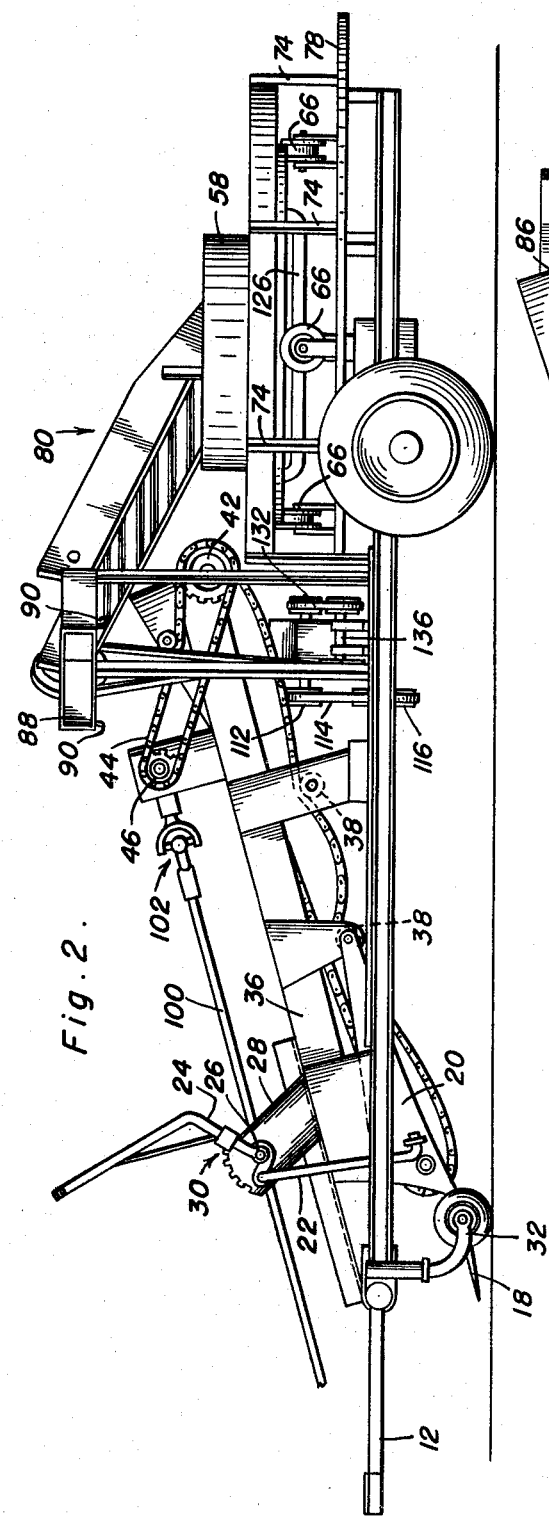
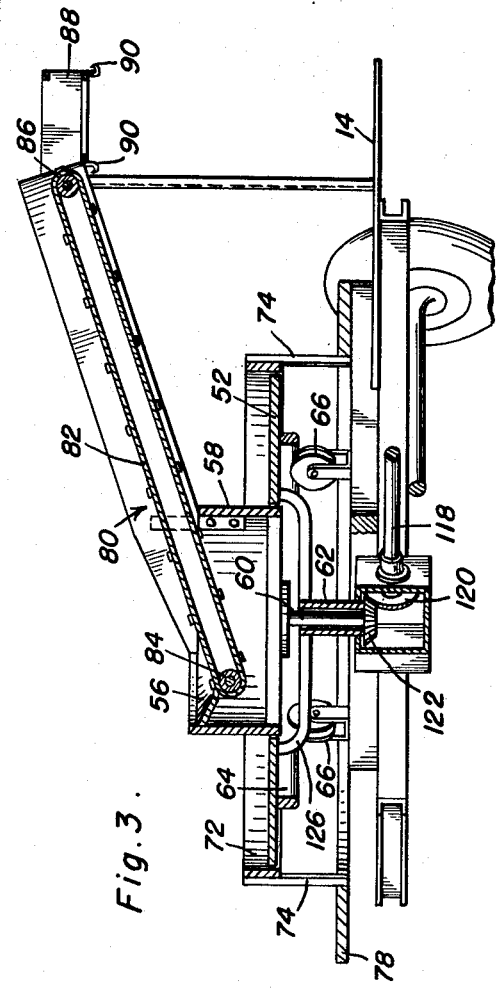
Warren V. Helms
INVENTOR.

Nov. 7, 1950   W. V. HELMS   2,529,023
POTATO DIGGING AND SEPARATING MACHINE
Filed Oct. 29, 1948   4 Sheets-Sheet 3

Warren V. Helms
INVENTOR.

BY *Thomas A. O'Brien*
*and Harvey B. Jacobson*
Attorneys

Nov. 7, 1950          W. V. HELMS          2,529,023
POTATO DIGGING AND SEPARATING MACHINE
Filed Oct. 29, 1948          4 Sheets-Sheet 4
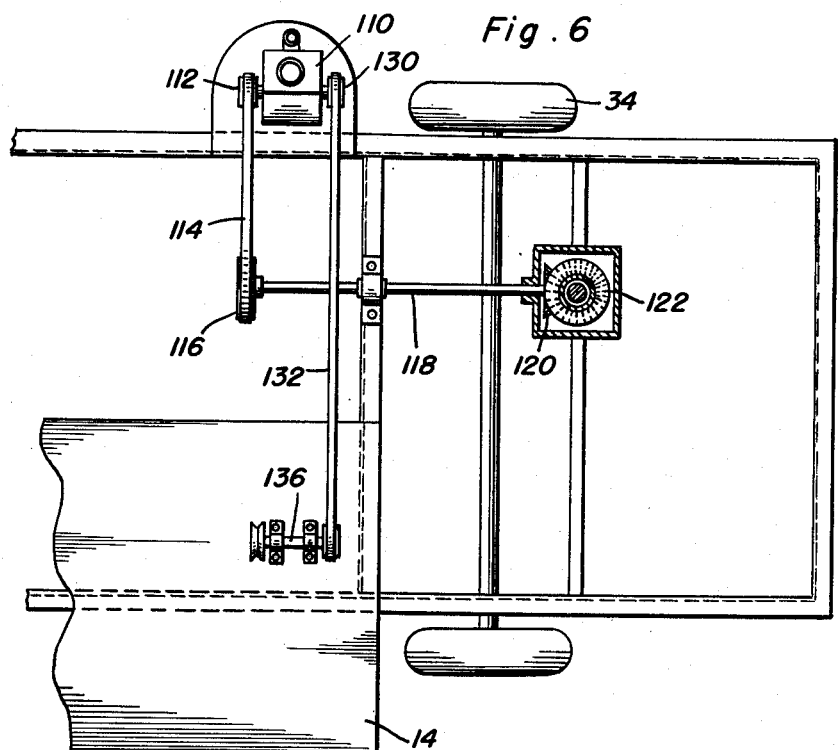
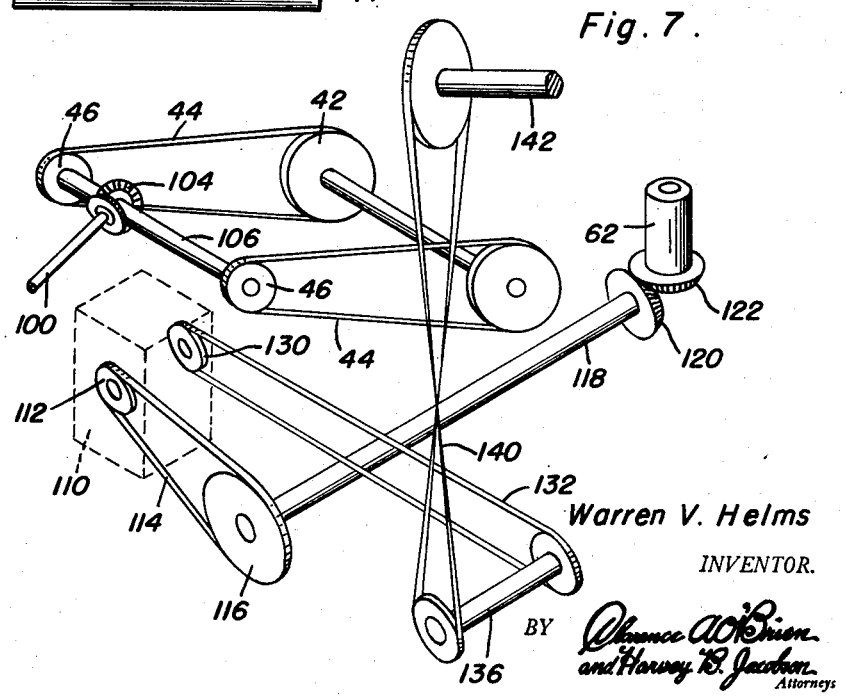

Patented Nov. 7, 1950

2,529,023

UNITED STATES PATENT OFFICE 2,529,023

POTATO DIGGING AND SEPARATING MACHINE

Warren V. Helms, La Jara, Colo.

Application October 29, 1948, Serial No. 57,203

4 Claims. (Cl. 55—9)

This invention appertains to novel and useful improvements in farm implements.

An object of this invention is to dig potatoes, convey them by means of an endless conveyor, a portion of which is vertically adjustable in accordance with the movement of the digger, receive the potatoes on a rotary platform, which platform is disposed adjacent a bench for seating individuals, whereby the individuals may separate the potatoes from the debris, allowing the debris to move with the rotary platform and to be urged therefrom by means of a baffle.

The rotary table or platform is provided with a central opening wherein there is disposed a funnel, a further object of this invention being to receive the potatoes in the funnel after the manual separation, and convey them by means of an elevator to a position whereby they are received in sacks.

Another object of this invention is to actuate the first mentioned conveyor by means of the power taken from a tractor or the like and to actuate the elevator or rotary platform by means of an independent engine, motor or the like.

Another object of this invention is to dig, separate and sack potatoes by means of an improved structure which is mechanically simplified.

Ancillary objects and features of novelty will become apparent to those skilled in the art, in following the description of the preferred form of the invention, illustrated in the accompanying drawings, wherein:

Figure 2 is an elevational view taken from the side of Figure 1;

Figure 3 is a sectional view taken substantially on the line 3—3 of Figure 1 and in the direction of the arrows;

Figure 6 is a sectional view illustrating particularly portions of the draught mechanism for the elevator and the rotary platform;

Figure 7 is a diagrammatic perspective view showing the drive mechanism of the present invention.

Specific structure of the present invention has been arrived at with a view to simplicity. A chassis or frame is composed of the usual and suitable material, substantially rectangular and generally indicated at 10. Any suitable type of chassis may be utilized, as found desirable. However, at the front portion thereof there must be a draw bar 12 adapted to be secured to a tractor or other suitable prime mover. A shelf 14 is mounted on the chassis in order to permit individuals to stand in proper locations for removing filled sacks of potatoes and for applying empty sacks thereto for subsequent filling. This structure will be described in detail subsequently.

Figure 1:
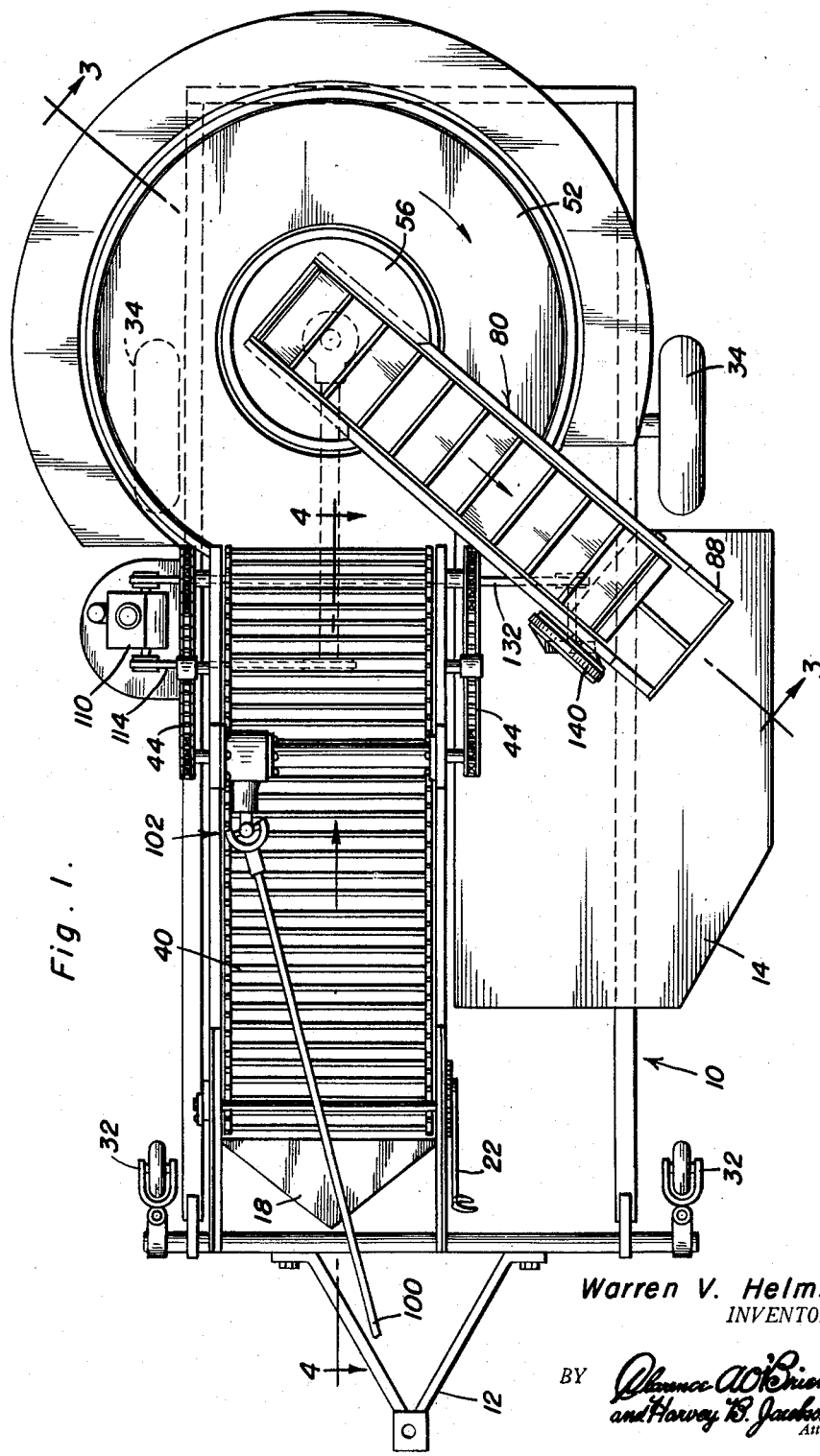
Figure 1 is a plan view of the preferred form of the invention.
Figure 4:
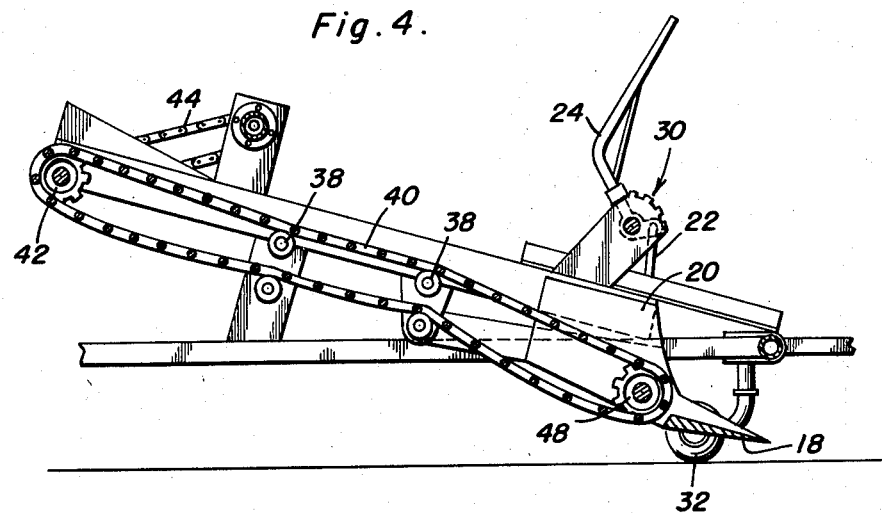
Figure 4 is a sectional view taken substantially on the line 4—4 of Figure 1 and in the direction of the arrows.

Attention is now directed primarily to Figure 4 wherein a digger 18 for potatoes is illustrated. This digger has side pieces 20 attached thereto, which side pieces have pitman links 22 secured thereto and also to a crank 24. The said crank is rotatably mounted by means of a pivot pin 26 to an upright 28, carried by a portion of the chassis. A conventional locking mechanism generally indicated at 30 is carried by the crank 24 in order to maintain it in selected position. It is now readily apparent that by movement of the crank 24, the digger 18 is selectively raised and lowered with respect to the chassis and the lower portions of the casters 32 at the front end thereof and the wheels 34 at the back end thereof.

Substantially parallel side pieces 36 (one of which carrying the upright 28) are disposed on the chassis. Suitable bracing supports the parallel side pieces 36 and also supports a number of rollers 38 having an endless conveyor 40 mounted therearound. The endless conveyor is of the chain type as is readily apparent from an inspection of Figure 4 and is journaled around a pair of driving gears 42 at the top end thereof. These driving gears have chains 44 entrained therearound, which are also entrained around driving gears 46. The opposite end of the endless conveyor is entrained around a pair of gears 48 which are mounted on a suitable shaft in the side pieces 20. It is now readily apparent that upon raising and lowering the digger 18, the lower portion of the endless conveyor will also be selectively adjusted.

After the potatoes are conveyed in this manner, they are deposited on a rotary platform 52 which has a central opening to accommodate a funnel-shaped baffle 56. (See Figure 3.) The funnel 56 is attached to a substantially circular sleeve member 58 which has a shaft 60 on the under surface thereof floatingly supported in a sleeve 62.

Figure 5:
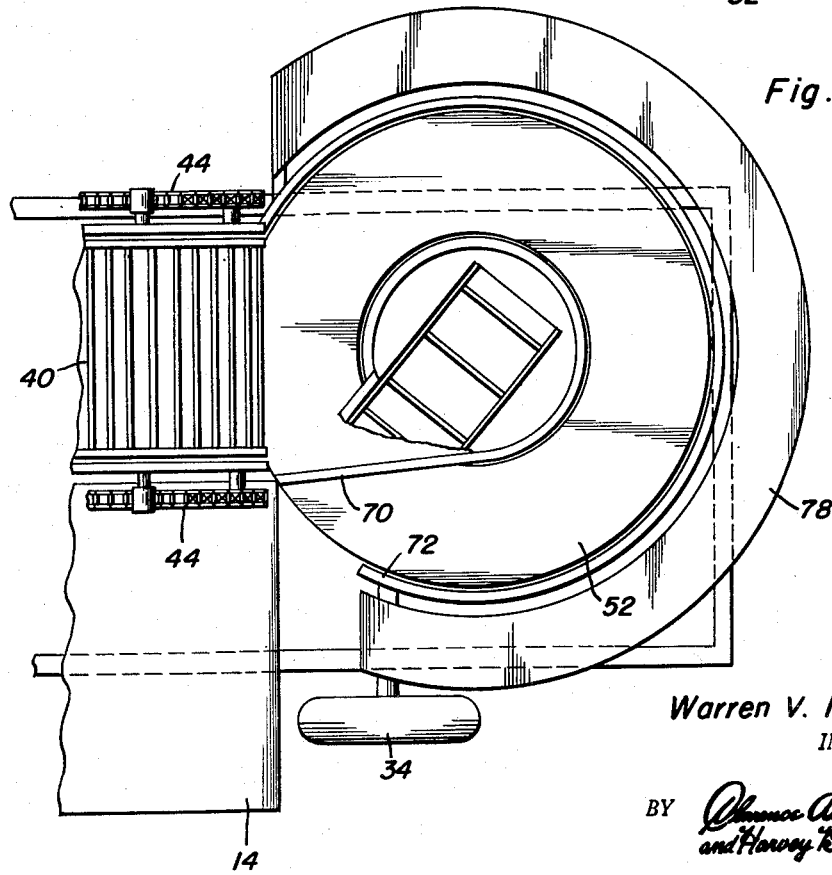
Figure 5 is a fragmentary top view with portions removed in order to illustrate various details in the structure.

A substantially circular rail 64 is mounted on the bottom surface of the rotary platform 52 and is disposed in a number of rollers 66 which are attached to a suitable chassis member. By this medium the platform is rotatively disposed on the chassis and in such location as the potatoes falling from the endless conveyor will be deposited thereon. The endless conveyor 40 is of the same type having a number of transverse slots in order that initial sifting may take place. However, some debris will be conveyed with the potatoes to the platform. The debris which is conveyed in this manner to the rotary platform 52 is urged therefrom by means of a baffle 70 seen best in Figure 5. A ledge 72 extends around the periphery of the rotary platform but has an opening therein for the exit of debris. This ledge may be supported by any suitable means such as the number of legs 74 which are secured to the chassis. Accordingly, upon rotation of the rotary platform 52, all the debris which is left when the potatoes are manually picked therefrom is urged from the upper surface of the platform.

In order to seat individuals in such locations as to render the top portion of the rotary platform accessible, a seat or shelf 78 is disposed below the platform and therearound. In operation, the debris and potatoes which are deposited on the rotary platform are separated manually, the potatoes being picked therefrom and thrown into the funnel 56.

An elevator generally indicated at 80 is disposed above the platform and the funnel 56. This elevator is in reality an endless conveyor indicated at 82, extending around an idler 84 at the lower end and around a driver 86 at the upper end. The upper end also supports a frame 88 having a number of hooks 90 depending therefrom in order to detachably support sacks for the potatoes. It is readily appreciated that the potatoes are urged by means of the elevator 80 into the sacks, whereby individuals standing on the shelf 14 may remove the filled sacks and replace them with empty ones for further operation.

For driving or actuating the various components of the device, two independent means are provided. The first means may be seen best in Figures 2 and 7 and includes a drive shaft 100 having a universal joint 102 therein. The said drive shaft is adapted to be secured to the power take-off of a tractor or the like for motivating the bevel gear 104. This bevel gear is fixed to a shaft 106 which supports the gear 46. This train of movement continues as described previously through the gears 42 and finally through the endless conveyor 40.

In order to actuate the elevator 80 and the cable or platform 52, a separate and independent means is utilized. The preferable construction is the utility of an engine 110 having a pulley 112 at one end thereof with a belt or chain 114 secured thereto. This belt or chain also is entrained around a larger pulley 116 which motivates a shaft 118. The said shaft 118 has a bevel gear 120 at the end thereof which is enmeshed with a complemental bevel gear 122. This last mentioned gear 122 is secured to the sleeve 62 described previously, and the sleeve supports a spider 126. This spider is attached to the under surface of the rotary platform 52 and this is how the rotative movement of the platform is imparted thereto.

The said motor 110 has another gear or pulley 130 extending therefrom and driven thereby. This last mentioned gear or pulley 130 has a long belt or chain 132 driven thereby, which in turn drives a shaft 136. This shaft in turn imparts movement to a crossed belt 140, which in turn motivates the shaft 142. The shaft 142 imparts movement to the elevator 80 which is of course, of the endless conveyor type. Thus, movement is imparted to the elevator.

Having described the invention, it is apparent that but one modification has been illustrated and described. However, it is appreciated that certain departures and variations as to specific structure may be made without departing from the spirit of the invention.

Having described the invention, what is claimed as new is:

1. In a potato digging and sacking machine, a chassis, a digger, means adjustably mounting said digger at the forward end of said chassis, a conveyor disposed behind said digger having a portion thereof carried by said digger for adjustment therewith, a rotary platform carried by said chassis adapted to receive potatoes from said conveyor, for manual separation from debris, an elevator disposed adjacent said platform to raise potatoes for reception in sacks, said elevator having one end disposed adjacent the center of said rotating platform and a funnel disposed adjacent said end for guiding potatoes on said elevator, a bench secured to said chassis to seat individuals for potato debris separation, and a baffle carried by said chassis disposed over said rotary platform to sweep debris from said platform.

2. In a potato digging and sacking machine, a chassis, a rotary platform carried by said chassis adapted to receive potatoes, for manual separation from debris, an elevator disposed adjacent said platform to raise potatoes for reception in sacks, said elevator having one end disposed adjacent the center of said rotating platform and a funnel disposed adjacent said end for guiding potatoes on said elevator, a bench secured to said chassis to seat individuals for potato debris separation, a baffle carried by said chassis disposed over said rotary platform to sweep debris from said platform, and means for actuating said rotary platform and said elevator.

3. A potato digging apparatus comprising a chassis having a potato digger mounted thereon, an endless conveyor disposed behind said digger to lift the potatoes and convey them, a rotary platform mounted on said chassis and arranged in a substantially horizontal plane, the discharge end of said conveyor being in communication with said rotary platform to empty potatoes and debris on said rotary platform, means mounting said rotary platform for rotation in the horizontal plane, a seat carried by said chassis adjacent said rotary platform whereby individuals on said seat may manually separate the potatoes from the debris, a funnel mounted on said chassis and above said platform to receive the manually separated potatoes, an elevator having one end disposed in said funnel and adapted to elevate the potatoes.

4. A potato digging apparatus comprising a chassis having a potato digger mounted thereon, an endless conveyor disposed behind said digger to lift the potatoes and convey them, a rotary platform mounted on said chassis and arranged in a substantially horizontal plane, the discharge end of said conveyor being in communication with said rotary platform to empty potatoes and debris on said rotary platform, means mounting said rotary platform for rotation in the horizontal plane, a seat carried by said chassis adjacent said rotary platform whereby individuals on said seat may manually separate the potatoes from the debris, a funnel mounted on said chassis and above said platform to receive the manually separated potatoes, an elevator having one end disposed in said funnel and adapted to elevate the potatoes, and a device at the discharge end of said elevator to hold releasably sacks in which the potatoes are deposited from the discharge end of said elevator.

WARREN V. HELMS.

REFERENCES CITED

The following references are of record in the file of this patent:

UNITED STATES PATENTS

| Number | Name | Date |
|---|---|---|
| 88,916 | Shaw | Apr. 13, 1869 |
| 1,009,899 | Eichner | Nov. 28, 1911 |
| 1,184,528 | Henderson | May 23, 1916 |
| 1,473,365 | Vogel | Nov. 6, 1923 |
| 2,488,983 | Packman | Nov. 22, 1949 |

FOREIGN PATENTS

| Number | Country | Date |
|---|---|---|
| 62,466 | Germany | June 3, 1892 |
| 4,278 | Austria | May 25, 1901 |
| 243,098 | Germany | Feb. 1, 1912 |
| 440,637 | Germany | Feb. 14, 1927 |
| 520,750 | Germany | Mar. 12, 1932 |